United States Patent
Ichioka

(10) Patent No.: US 8,047,755 B2
(45) Date of Patent: Nov. 1, 2011

(54) PLATE MATERIAL STOCKER FACILITY

(75) Inventor: Hirokazu Ichioka, Inuyama (JP)

(73) Assignee: Murata Machinery, Ltd., Kyoto-shi, Kyoto (JP)

( * ) Notice: Subject to any disclaimer, the term of this patent is extended or adjusted under 35 U.S.C. 154(b) by 344 days.

(21) Appl. No.: 12/414,230

(22) Filed: Mar. 30, 2009

(65) Prior Publication Data

US 2009/0257851 A1    Oct. 15, 2009

(30) Foreign Application Priority Data

Apr. 14, 2008    (JP) ................. 2008-104314

(51) Int. Cl.
*B65H 1/00*    (2006.01)
(52) U.S. Cl. ............ 414/222.01; 414/331.1; 414/331.11
(58) Field of Classification Search .......... 414/222.1, 414/222.01, 333.03, 333.1, 333.11, 331.03, 414/331.1, 333.111
See application file for complete search history.

(56) References Cited

U.S. PATENT DOCUMENTS 3,075,656 A * 1/1963 Pearne ................. 414/331.1
7,621,710 B2 * 11/2009 Ichioka ................ 414/331.11

FOREIGN PATENT DOCUMENTS

| JP | 5-85608 A | 4/1993 |
|---|---|---|
| JP | 2000-117374 A | 4/2000 |
| JP | 2001-88940 A | 4/2001 |
| JP | 2006-176233 A | 7/2006 |

* cited by examiner

*Primary Examiner* — Donald Underwood
(74) *Attorney, Agent, or Firm* — Westerman, Hattori, Daniels & Adrian, LLP

(57) ABSTRACT

The present invention provides a plate material stocker facility with a simplified pallet loading and unloading mechanism. The plate material stocker facility includes a plate material stocker 4 in which pallets 9 each allowing a plate material to be stacked thereon are stored, and a pallet slide device 2. The plate material stocker 4 has a plurality of pallet support portions 10 arranged in stages in a vertical direction, the pallet support portions slidably moving the respective pallets 9 in a front-back direction, and supporting the respective pallets 9 and switchably moving the pallets 9 between a first position 4a and a second position 4b, and a plurality of posts 11, 12 supporting the pallet support portions 10. A gap is present between the adjacent pallet support portions 10. The posts 12 located at a rear end are arranged inside respective lateral ends of the pallet support portions 10. The pallet slider device 2 has a slider 30 that is movable in a direction parallel to a slide direction of each of the pallets 9, and pallet abutting portions 33 attached to the slider 30 and coming into abutting contact with the pallet 9. The pallet abutting portions 33 come into abutting contact with the abutting target portions 18 of the pallet 9 at positions outside, in a lateral direction, the respective posts 12.

3 Claims, 7 Drawing Sheets

PLATE MATERIAL STOCKER FACILITY

FIELD OF THE INVENTION

The present invention relates to a plate material stocker facility that stores raw plate materials carried into a plate material processing machine and product plate materials carried out from the plate material processing machine.

BACKGROUND OF THE INVENTION

In a certain plate material stocker facility that stores raw plate materials carried into a plate material processing machine and product plate materials carried out from the plate material processing machine, a plurality of shelves are provided which are arranged in stages and on which pallets with the plate materials stacked thereon are stored. In a plate material stocker facility of this kind, an elevator device loads and unloads the pallets onto and from the respective shelves (for example, the Unexamined Japanese Patent Application Publication (Tokkai-Hei) No. 5-85608). A plate material conveying device (for example, the Unexamined Japanese Patent Application Publication (Tokkai-Hei) No. 2000-117374) conveys the plate materials between the plate material processing machine and the pallets in the plate material stocker facility.

The conventional plate material stocker facility has the elevator device and a device that transfers the pallets between the elevator device and the shelves or the plate material conveying device. The conventional plate material stocker facility thus has a complicated structure. Furthermore, a power source is required to drive the above-described devices. Moreover, because of the heavy weight of the pallet, the elevating and lowering speed of the elevator cannot be significantly increased. A long time is also required to transfer the pallets between the elevator device and the shelves or the plate material conveying device. It is thus difficult to improve the efficiency with which the pallets are loaded in and unloaded from the plate material stocker facility.

To solve this problem, a plate material stocker facility may be provided in which the plate material conveying device includes a slider that is movable in a horizontal direction to draw out a pallet from any of a plurality of pallet support portions of the plate material stocker facility. In this case, the slider includes a draw-out tool that moves in a draw-out direction to draw out a pallet from any of the pallet support portions.

However, the plurality of pallet support portions are supported by, for example, four posts arranged in the respective corners of the pallet support portions. Thus, when the slider moves forward to or backward from the pallet support portions, the draw-out tool needs to move around the posts. The draw-out tool thus has a complicated structure.

SUMMARY OF THE INVENTION

An object of the present invention is to provide a plate material stocker facility with a simplified pallet loading and unloading mechanism.

Another object of the present invention is to facilitate the loading and unloading of pallets based on movement in both forward and backward directions.

Yet another object of the present invention is to simplify the general configuration of the plate material stocker facility including a carry-in and carry-out mechanism that caries plate materials into and out from a plate material processing machine.

A plate material stocker facility according to the present invention comprises a plate material stocker in which pallets each allowing a plate material to be stacked thereon are stored, and a pallet slide device. The plate material stocker has a plurality of pallet support portions arranged in stages in a vertical direction, the pallet support portions slidably moving the respective pallets in a front-back direction, and supporting the respective pallets and switchably moving the pallets between a first position and a second position, and a plurality of posts supporting the pallet support portions. A gap is present between the adjacent pallet support portions. Those of the plurality of posts located at a rear end of the pallet slide device corresponding to an entry side end are arranged inside respective lateral ends of the pallet support portions. The pallet slider device has a slider that is movable in a direction parallel to a slide direction of each of the pallets, and pallet abutting portions attached to the slider and coming into abutting contact with respective abutting target portions of the pallet. The pallet abutting portions come into abutting contact with the abutting target portions of the pallet at positions outside, in a lateral direction, the respective posts positioned at the rear end.

In this configuration, of the posts supporting the pallet support portion of the plate material stocker, those which are located at the rear end of the pallet slide device corresponding to the entry side end are arranged inside the respective lateral ends of the pallet support portions. The pallet abutting portions of the slider of the pallet slide device are provided outside the corresponding posts in the lateral direction. Thus, the slider can be moved forward and backward to load and unload the pallet with the pallet abutting portions prevented from interfering with the posts. Thus, the plate material stocker facility has a simple structure in which the pallet loading and unloading mechanism moves the slider forward and backward to move the pallet. The pallet can be switchably moved between the first position (for example, a storage area) and second position (for example, a loading and unloading area) in the plate material stocker.

In the present invention, each of the abutting target portions may be a projecting piece projecting upward from a plate material placement surface at an end of the pallet in the front-back direction. The pallet slide device may come into abutting contact with one of a front surface and a rear surface of each of the projecting pieces of the pallet to slide the pallet from the first position to the second position or with the other of the front surface and rear surface of the projecting piece to slide the pallet from the second position to the first position.

When each of the abutting target portions of the pallet is the projecting piece as described above, the pallet can be slid both forward and backward by switching, between the front surface and the rear surface of each projecting piece, the target with which the pallet abutting portions of the pallet slide device are brought into contact. Thus, the plate material stocker facility can be simply configured to allow the pallet to slide both forward and backward easily.

In the present invention, the pallet slide device may also serve as a device carrying the plate materials into or out from the plate material processing machine. The device carrying the plate materials into or out from the plate material processing machine may perform both an operation of carrying the plate materials into the plate material processing machine and an operation of carrying the plate materials out from the plate material processing machine.

The device carrying the plate materials into or out from the plate material processing machine may include a means for gripping the plate materials or a mechanism moving the plate materials forward and backward in order to, for example, position the plate materials. Such a mechanism may also be used for forward and backward movement for the pallet slide device. The present invention can thus simplify the general configuration of the plate material stocker facility including the plate material carry-in and carry-out device.

The plate material stocker facility according to the present invention comprises the plate material stocker in which the pallets each allowing the plate material to be stacked thereon are stored, and the pallet slide device. The plate material stocker has the plurality of pallet support portions arranged in stages in the vertical direction, the pallet support portions slidably moving the respective pallets in the front-back direction, and supporting the respective pal lets and switchably moving the pal lets between the first position and the second position, and the plurality of posts supporting the pallet support portions. The gap is present between the adjacent pallet support portions. Those of the plurality of posts located at the rear end of the pallet slide device corresponding to the entry side end are arranged inside the respective lateral ends of the pallet support portions. The pallet slider device has the slider that is movable in the direction parallel to the slide direction of the pallets, and the pallet abutting portions coming into abutting contact with the abutting target portion of the pallet. The pallet abutting portions come into abutting contact with the abutting target portion of the pallet at the positions outside, in the lateral direction, the respective posts positioned at the rear end. Thus, the pallet loading and unloading mechanism can be simplified.

The plate material stocker facility may further be configured as follows. Each of the abutting target portions is the projecting piece projecting upward from the plate material placement surface at the end of the pallet in the front-back direction. The pallet slide device comes into abutting contact with one of the front surface and rear surface of the projecting piece to slide the pallet from the first position to the second position or with the other of the front surface and rear surface of the projecting piece to slide the pallet from the second position to the first position. This arrangement facilitates the loading and unloading of the pallet based on both the forward movement and backward movement.

The pallet slide device may also serve as the device carrying the plate materials into or out from the plate material processing machine. This arrangement can simplify the general configuration of the plate material stocker facility including the plate material carry-in and carry-out device.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
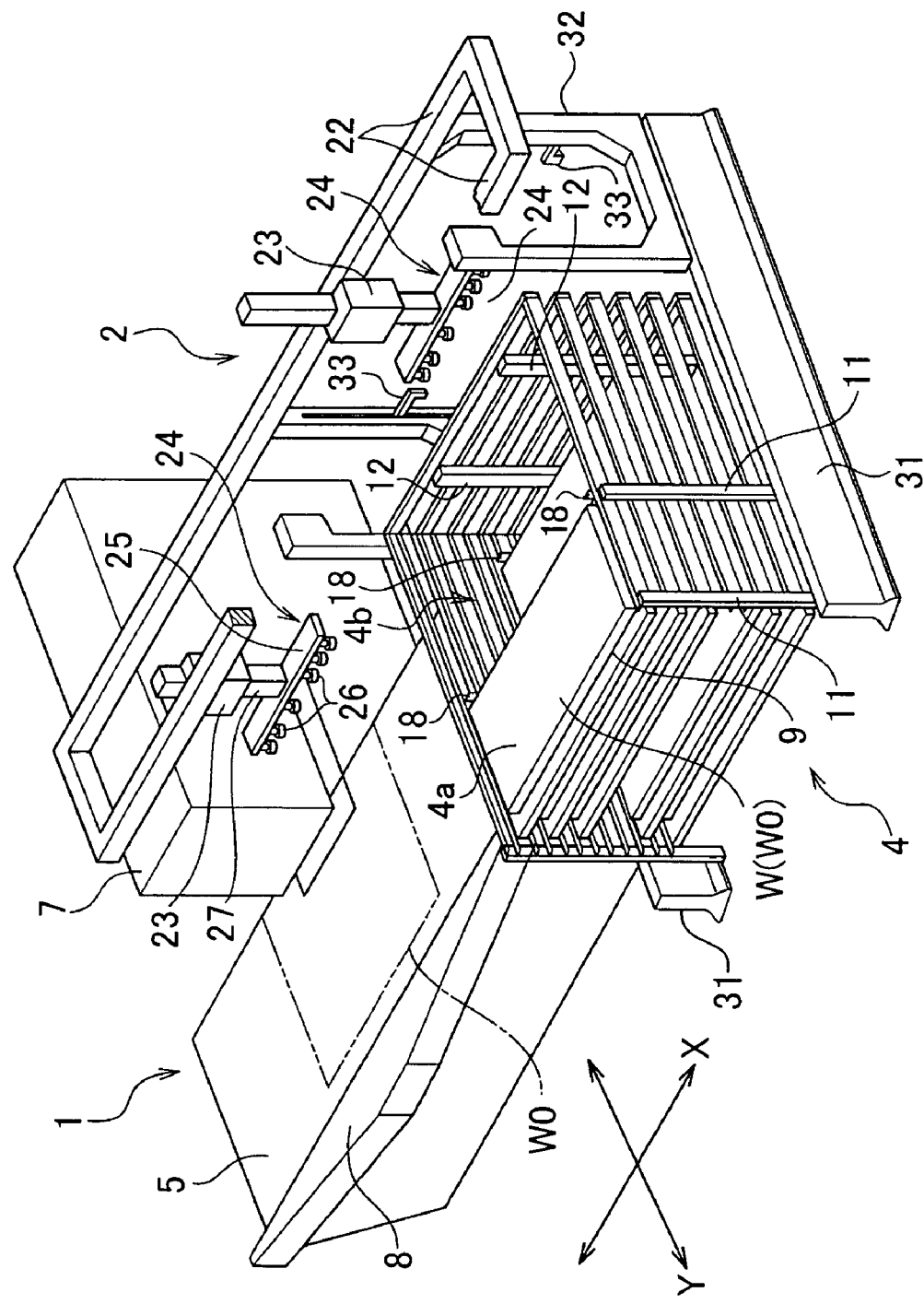
FIG. 1 is an exploded perspective view showing a part of a plate material processing machine including a plate material stocker facility according to an embodiment of the present invention.

A first embodiment of the present invention will be described with reference to FIGS. 1 to 8. FIG. 1 shows a plate material processing machine 1, a plate material conveying device 2 that carries plate materials into and out from the plate material processing machine 1, and a plate material stocker facility 3 in which the plate materials are stored. The plate material stocker facility 3 is includes of a plate material stocker 4 that stores pallets 9 on which the respective plate materials can be stacked, and a pallet slide device that slides the stored pallets 9. The plate material conveying device 2 also serves as the pallet slide device.

The plate material processing machine 1 has the function of processing a raw plate material W0 on a table 5 into a product plate material W by means of punching, stamping, or the like. The plate material processing machine 1 includes a punch press, a laser processing machine, or the like. In this example, the plate material processing machine 1 is a punch press and includes a processing portion 7 that elevates and lowers a punch tool with respect to a die tool (not shown in the drawings) for processing, and a plate material feeding mechanism 8 that moves the raw plate material W0 forward and backward (Y direction) and rightward and leftward (X direction) on the table 5.

As shown in FIGS. 2 to 5, the plate material stocker 4 has a plurality of pallet support portions 10 arranged in stages in a vertical direction and which slidably move the respective pallets 9 forward and backward. The pallet support portions 10 support the respective pallets 9 and switchably move the pallets 9 between a first position 4a that is a front position and a second position 4b that is a rear position. The first position 4a is an area where the plate materials are stored together with the pallets 9. The second position 4b is an area where the plate material is loaded onto or unloaded from the pallet 9. The pallet support portions 10 are supported by two posts 11 arranged at the outer periphery of the pallet support portions 10 on each of the opposite sides thereof, and two posts 12 arranged at the rear end of the pallet support portions 10. A gap is created between the adjacent pallet support portions 10. The outer periphery of the pallet support portions 10 means an area that contacts the inside of a coupling member 14 described below.

Each of the pallet support portions 10 has laterally paired guide members that face the front-back direction, and the coupling member 14 that couples the rear ends of the guide members 13 together. The pallet support portion 10 has a planar shape generally like the letter U. The two posts 11, which support the pallet support portions 10 at each of the opposite sides thereof, are arranged in front of an intermediate position in the front-back direction. Furthermore, the two posts 12, which support the pallet support portions 10 at the rear end thereof, are arranged inside the respective lateral ends of the pallet support portions 10. The lower ends of the posts 12, which support the pallet support portions 10 at the rear end thereof, are in contact with a floor surface. The posts 12 may be an assembly of a plurality of coupling members (not shown in the drawings) interposed between the pallet support portions 10 to couple the pallet support portions 10 together.

Figure 5:
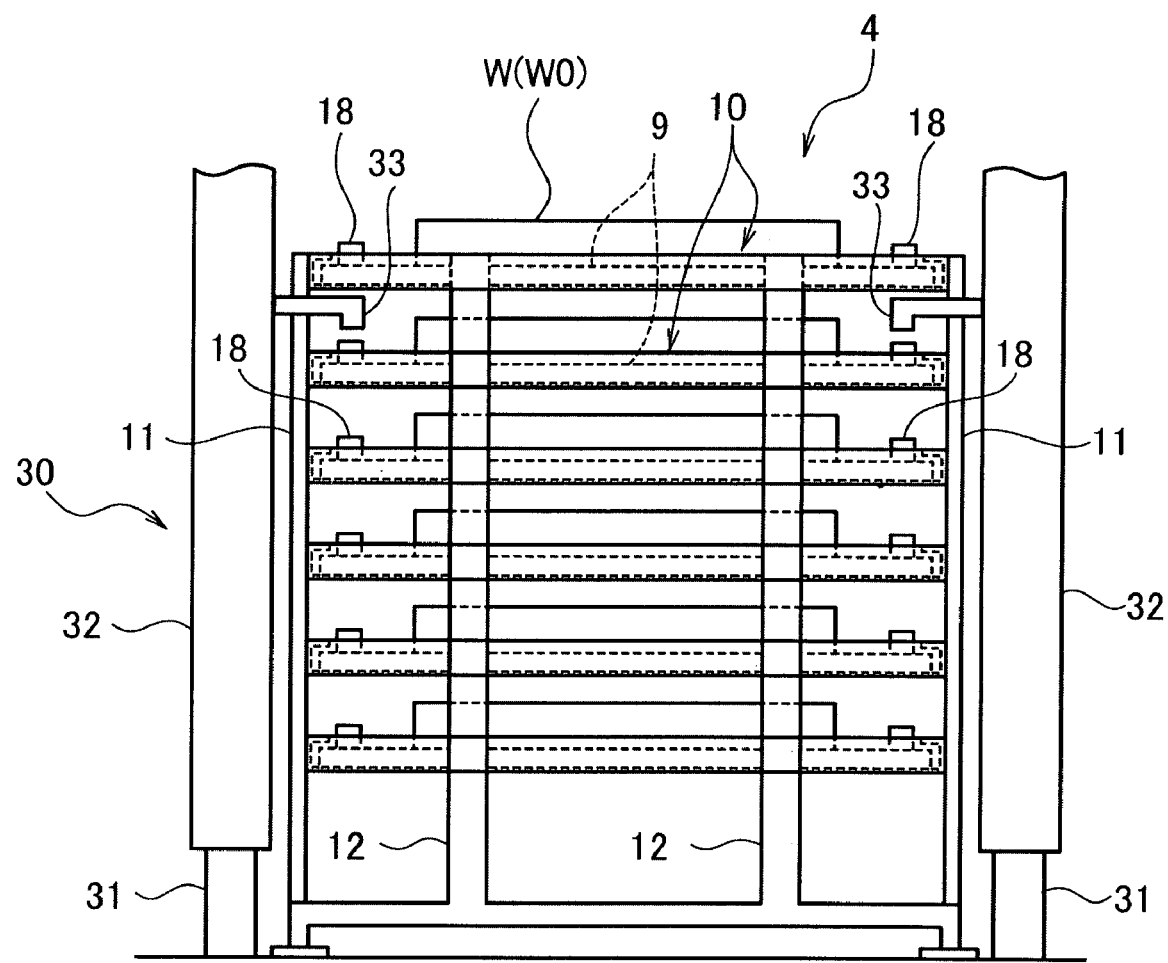
FIG. 5 is a rear view of a plate material stocker in the plate material stocker facility.
Figure 6A:
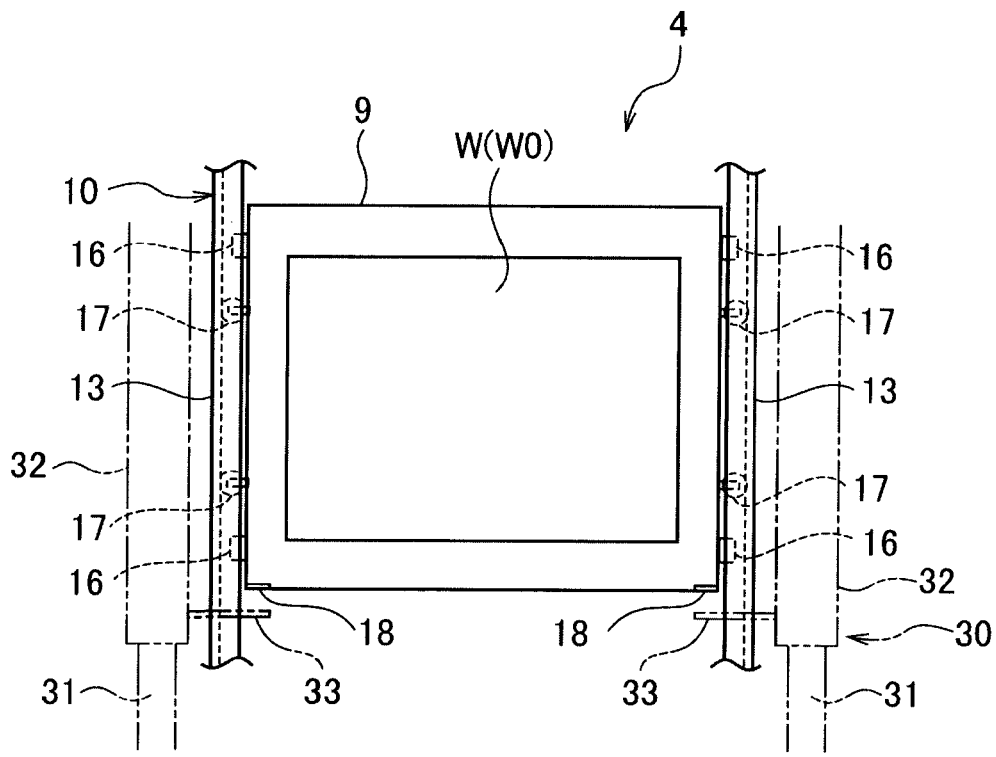
FIG. 6A is a plan view of a pallet support portion of the plate material stocker.
Figure 6B:
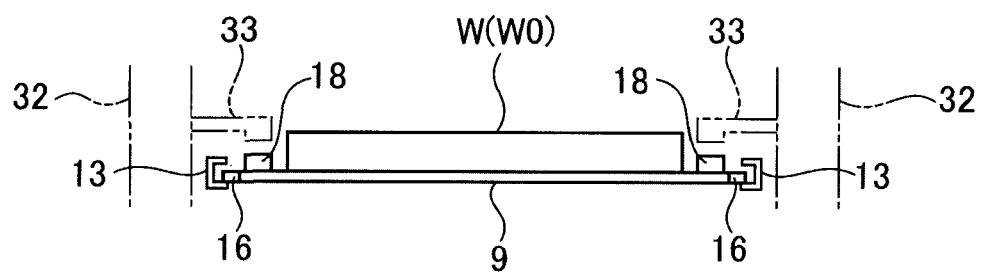
FIG. 6B is a sectional view of the pallet support portion.
Figure 6C:
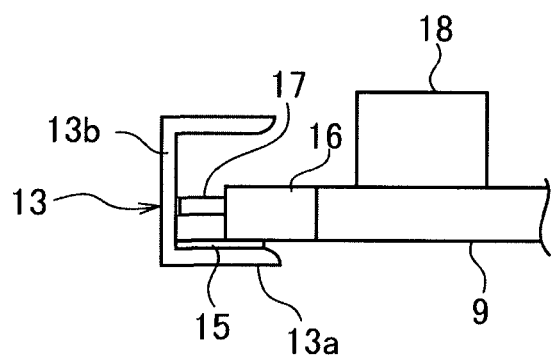
FIG. 6C is a partial enlarged view of FIG. 6B.

As shown in FIG. 6, the guide members 13 of each of the pallet support portions 10 are members made up of steel or the like and having a U-shaped cross section. The guide members 13 are arranged with openings thereof directed inward. A sliding surface member 15 made up of a metal material with a smoothed top surface is laid on the top surface of a lower flange portion 13a of each of the guide members 13. On the other hand, a sliding member 16 and a guide roller 17 are arranged on each of the opposite sides of the pallet 9 in the front-back direction; the sliding member is made up of a resin containing a lubricant such as MC nylon (registered trade mark), and the guide roller 17 has an axis extending in the vertical direction. The sliding member 16 is placed on the sliding surface member 14 of the guide member 13. The guide roller 17 is pressed against the inner surface of a web portion 13b of the guide member 13. Thus, the pallet 9 is supported so as to be slidable in the front-back direction with respect to the pallet support portion 10. Furthermore, since the load of the pallet 9 is slidably guided, the pallet 9 is prevented from being inadvertently moved and can be stopped at any position. Abutting target portions 18 being composed of projecting pieces projecting upward from the plate material placement surface are provided at the rear end of the pallet 9 and close to the respective laterally opposite ends. As shown in FIG. 5, the abutting target portions 18 are positioned outside the respective posts 12 in the lateral direction.

The plate material conveying device 2 conveys the plate materials W0, W between a loading and unloading area that is the second position 4b in the plate material stocker 4 and the plate material processing machine 1. For example, the raw plate material W0 dispatched to the second position 4b (loading and unloading area) in the plate material stocker 4 is carried into the plate material processing machine 1 by the plate material conveying device 2. The product plate material W processed by the plate material processing machine 1 is carried out to the second position 4b (loading and unloading area) in the plate material stocker 4 by the plate material conveying device 2.

Figure 2:
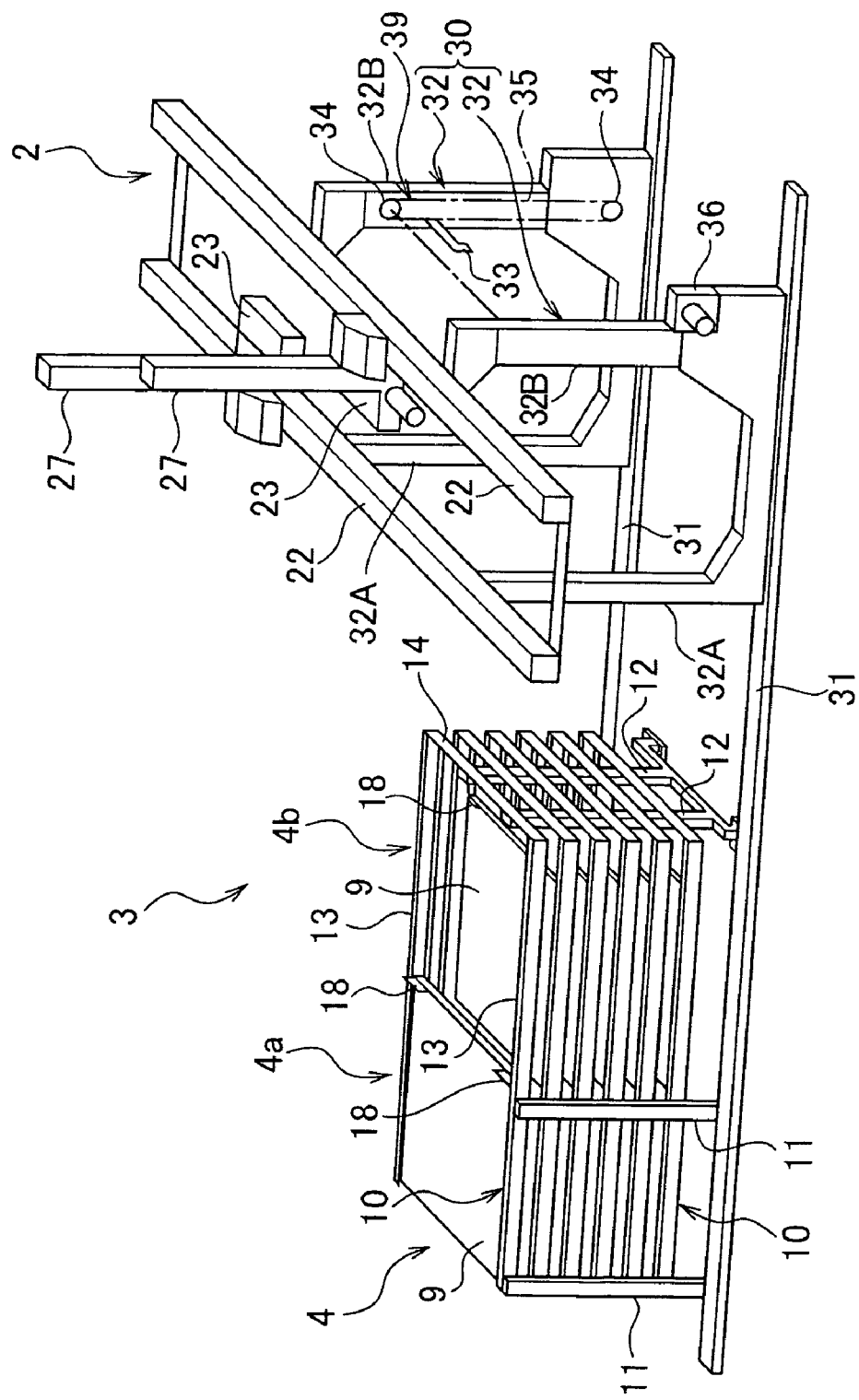
FIG. 2 is a perspective view of the plate material stocker facility.
Figure 3:
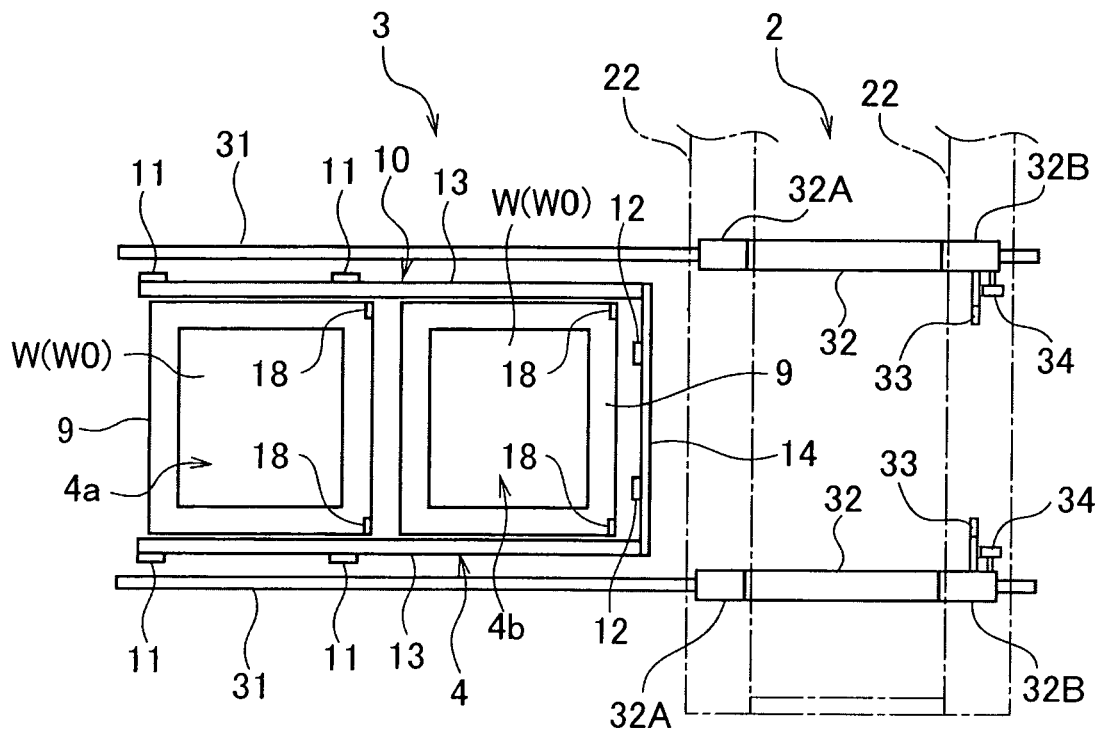
FIG. 3 is a plan view of the plate material stocker facility.
Figure 4:
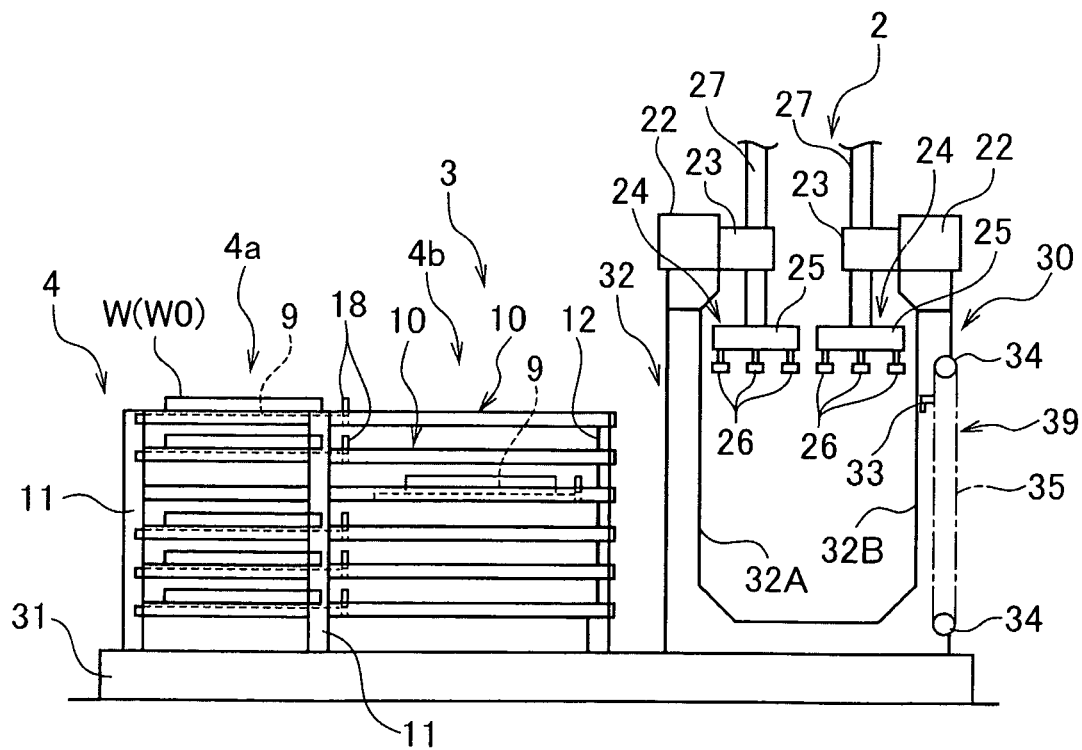
FIG. 4 is a side view of the plate material stocker facility.

As shown in FIGS. 2 and 4, the plate material conveying device 2 includes two tracks 22 installed parallel to each other between the plate material processing machine 1 and the plate material stocker 4 and facing the lateral direction, and traveling members 23 that can travel independently along the respective tracks 22. Each of the traveling members 23 includes a plate material holding member 24. Each of the traveling members 23 can travel along the track 22 via a guide member (not shown in the drawings) and is self-propelled by a traveling driving source such as a servo motor. The guide member is, for example, a direct acting roll bearing or a guide roller.

The plate material holding member 24 includes a pad support frame 25 extending in the front-back direction, and a plurality of suction pads 26 attached to the pad support frame 25. The suction pads 26 are connected to a vacuum source. The vacuum source is driven to generate a negative pressure to stick the suction pads 26 to the plate materials W0, W. The plate holding member 24 is attached to a vertically moving member 27 fitted into the traveling member 23 so that the vertically member 27 is movable in the vertical direction. An elevating and lowering driving source (not shown in the drawings) moves the vertically moving member 27 in the vertical direction to elevate and lower the vertically moving member 27. The elevating and lowering driving source may be separate from the traveling member 23 or the traveling member 23 may be the elevating and lowering driving source.

The two tracks 22 are coupled and integrated together at the opposite ends thereof. The two tracks 22 are supported by a slider 30 that is movable in a direction parallel to the slide direction of the pallet 9. The slider 30 has laterally paired moving mounts 32 that are movable in the front-back direction along respective front-back movement rails 31. The laterally paired moving mounts 32 can be moved in the front-back direction by a front-back moving driving source (not shown in the drawings). The front-back moving driving source includes, for example, a servo motor and a conversion mechanism such as a ball screw which converts rotation of the servo motor into linear motion. Each of the laterally paired moving mounts 32 has a pair of a front post 32A and a rear post 32B. A pallet abutting portion 33 that comes into abutting contact with the abutting target portion 18 of the pallet 9 is provided on the rear post 32B so as to project inward in the lateral direction and to be movable in the vertical direction. Specifically, the pallet abutting portion 33 is installed on a guide member (not shown in the drawings) provided on the rear post 32B along the vertical direction so that the pallet abutting portion 33 can elevate and lower freely. The pallet abutting portion 33 is coupled to an endless belt 35 passed between paired pulleys 34, 34 arranged on the inward surface of the rear post 32B in the vertical direction. The pallet abutting portion 33 is rotationally driven to elevate and lower by means of the pulleys 34, driven by a pulley driving source 36. A pallet abutting portion elevating and lowering mechanism 39 elevating and lowering the pallet abutting portion 33 includes the endless belt 35 and the pulley driving source 36. The pallet abutting portions 33 are located outside, in the lateral direction, the respective rear posts 12 of the plate material stocker 4. The slider 30 moves forward and backward to enable the pallet abutting portions 33 to come into abutting contact with the respective abutting target portions 18 of the pallet 9. Thus, the plate material conveying device 2 also serves as the pallet slide device in the plate material stocker facility 3.

Figure 7A:
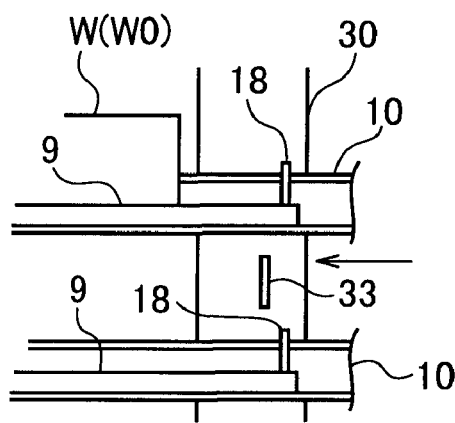
FIG. 7 is a diagram illustrating a pallet draw-out operation.
Figure 7B:
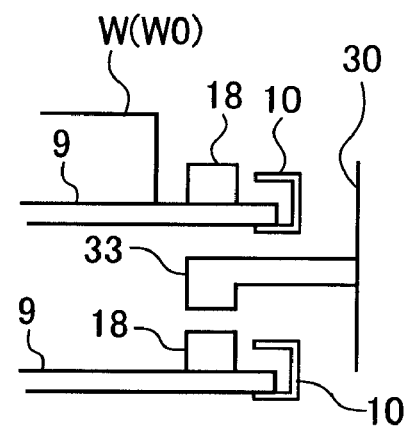
Figure 7C:
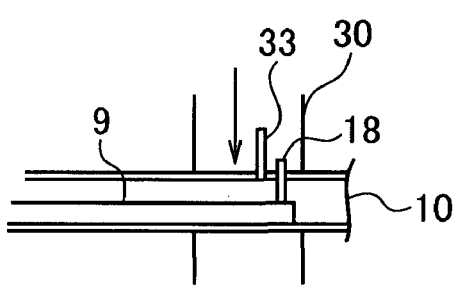
Figure 7D:
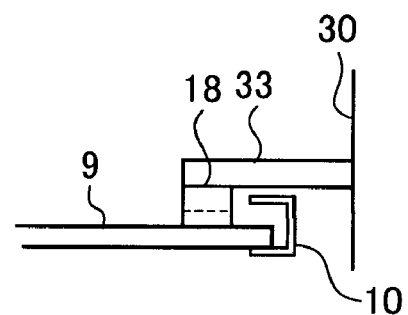
Figure 7E:
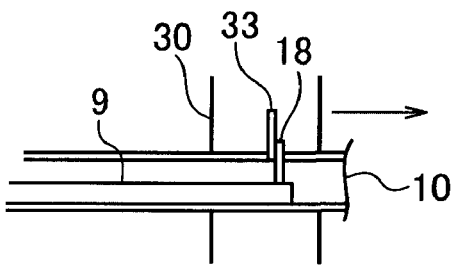
Figure 8A:
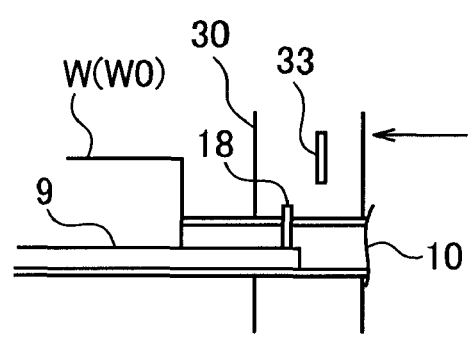
FIG. 8 is a diagram illustrating a pallet returning operation.
Figure 8B:
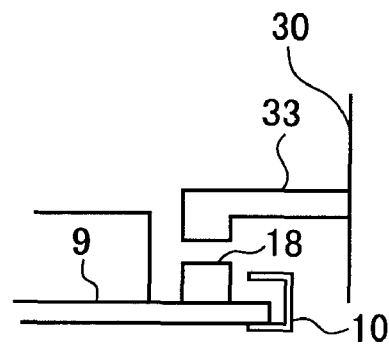
Figure 8C:
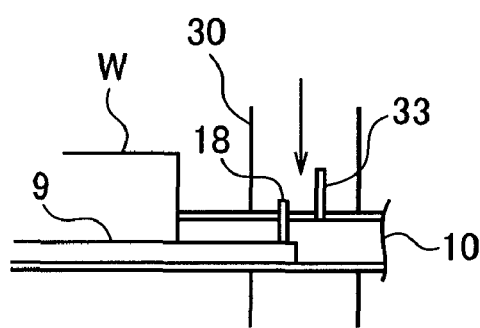
Figure 8D:
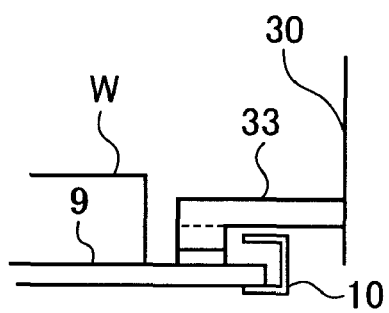
Figure 8E:
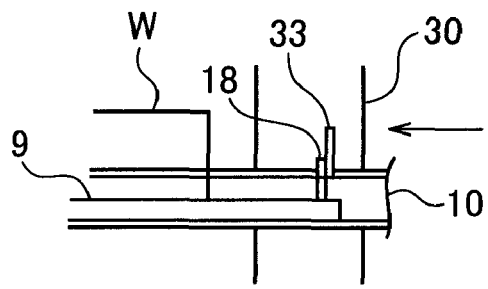

Operation of the plate material stocker facility 3 configured as described will be described. The slider 30 in the plate material conveying device 2 shown in FIG. 7 operates to draw out the pallet 9 stored at the first position (storage area) 4a in the plate material stocker 4, to the second position (loading and unloading area) 4b. In this case, first, the pallet abutting portions 33 are elevated or lowered to adjust the height of the pallet abutting portions 33 so that the height is equal to that of the gap (the position slightly higher than the abutting target portions 18 of the pallet 9) between the pallet support portion 10 on which the pallet 9 to be drawn out is supported and the pallet support portion 10 located immediately above the above-described pallet support portion 10. Then, as shown in FIGS. 7A and 7B, the slider 30 is moved forward until the pallet abutting portions 33 pass over the position of the abutting target positions 18 of the pallet 9. At this time, since the pallet abutting portions 33 are located outside, in the lateral direction, the posts 12, arranged at the rear end of the plate material stocker 4, the pallet abutting portions 33 are prevented from interfering with the posts 12. Then, as shown in FIGS. 7C and 7D, the pallet abutting portions 33 are lowered to a height at which the pallet support portions 10 can come into abutting contact with the respective abutting target portions 18. In this condition, as shown in FIG. 7E, the slider 30 is moved backward to bring the pallet abutting portions 33 into abutting contact with the respective abutting target portions 18 of the pallet 9. The pallet 9 is thus drawn out to the second position (loading and unloading area) 4b in the plate material stocker 4. Varying the height of the pallet abutting portions 33 allows the pallet 9 stored on any of the pallet support portions 10 to be drawn out.

In the above-described operation, the maximum forward position of the pallet abutting portions 33 is the intermediate position on the plate material stocker 4 in the front-back direction. Thus, the posts 11, which support the pallet support portions 10 at the respective ends thereof, are prevented from interfering with the pallet abutting portions 33.

In the plate material conveying device 2, the moving mounts 32 move forward and backward along the front-back movement rails 31. The traveling members 23 further travel along the respective tracks 22. The plate material holding members 24 are then elevated or lowered to convey the product plate material W held on the plate material processing machine, to the pallet 9 located at the second position (loading and unloading position) 4b in the plate material stocker 4. A relatively small product plate material W is conveyed by one of the traveling member 23. A large product plate material W is conveyed by the two cooperating traveling members 23.

As shown in FIG. 8, the abutting target portions 18 of the pallet 9 with the product plate material W stacked thereon are brought into abutting contact with the respective pallet abutting portions 33 of the slider 30. The slider 30 is then moved forward to return the pallet 9 from the second position (loading and unloading area) to the first position (storage area) in the plate material stocker 4. By elevating or lowering the pallet abutting portions 33 to vary the height of the pallet abutting portions 33, the pallet 9 on any of the pallet support portions 10 can be returned from the second position (loading and unloading area) 4b to the first position (storage area).

The above-described operation relates to the case where the empty pallet 9 is drawn out to the second position (loading and unloading area) 4b and the product material W is placed on the pallet 9, which is then returned to the first position (storage area) 4a. However, for example, the following operation can also be performed as described above. The pallet 9 with the raw plate material W0 placed thereon is drawn out to the second position (loading and unloading area). The raw plate material W0 is then conveyed to the plate material processing machine 1. The product plate material W is then placed on the empty standing-by pallet 9. The pallet 9 is then returned to the first position (storage area) 4a.

Thus, in the plate material stocker facility 3, the posts 12, which support the pallet support portions 10 of the plate material stocker 4 at the rear end thereof, are located inside the respective laterally opposite ends of the pallet support portions 10. Furthermore, the pallet abutting portions 33, which come into abutting contact with the respective abutting target portions 18 of the pallet 9, are attached to the slider 30 in the plate material conveying device 2, also serving as the pallet slide device. In this case, the pallet abutting portions 33 are located outside the respective posts 12 in the lateral direction. Thus, the pallet loading and unloading mechanism can be simplified. The simple forward and backward movement of the slider 30 can be used to switchably move the pallet 9 between the first position (storage area) 4a and the second position (loading and unloading area) 4b in the pallet material stocker 4. Additionally, the plate material stocker 4 can be simply configured.

Furthermore, in the present embodiment, the abutting target portions 18 of the pallet 9 are the projecting pieces projecting upward from the plate material placement surface of the pallet 9 at the end of the pallet 9 in the front-back direction. The plate material conveying device 2, also serving as the pallet slide device, comes into abutting contact with one of the front and rear surfaces of each of the abutting target portions 18, being composed of the projecting pieces of the pallet 9. The pallet 9 thus slides from the first position 4a to the second position 4b. The plate material conveying device 2 comes into abutting contact with the other of the front and rear surfaces to slide the pallet 9 from the second position 4b to the first position 4a. Thus, the present embodiment uses the simple configuration to allow the pallet 9 to be slid both forward and backward.

The abutting target portions 18 of the pallet 9 may be the rear or front end surface of the pallet 9 instead of the projecting pieces. In this case, in the above-described pallet draw-out operation, the front end surface of the pallet is used as the abutting target surface 18. In the pallet returning operation, the rear end surface of the pallet 9 is used as the abutting target surface 18. Then, the pallet 9 can be switchably moved between the first position 4a and the second position 4b.

Furthermore, in the present embodiment, the plate material conveying device, which loads the plate materials W0, W into the plate material processing machine 1, also serves as the pallet slide device for the plate material stocker facility 3. Thus, the general configuration of the plate material stocker facility can be simplified.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the scope of the invention.

I claim:

1. A plate material stocker facility, comprising:
   a plate material stocker comprising
      a plurality of pallets configured such that a plate material can be stacked thereon,
      a plurality of pallet support portions arranged in stages in a vertical direction, said pallets being slidably movable on said pallet support portions in a front-back direction between a first position and a second position,
      a plurality of posts supporting the pallet support portions, and
      abutting target portions on each of said plurality of pallets, and
   a pallet slide device comprising
      a slider that is movable in a direction parallel to a slide direction of said plurality of pallets, and
      pallet abutting portions attached to the slider and configured to come into abutting contact with said abutting target portions of said plurality of pallets,
   wherein a gap is present between the adjacent pallet support portions,
   wherein among said plurality of posts, rear end posts disposed at a rear end of the pallet slide device, corresponding to an entry side end, are arranged inside respective lateral ends of said plurality of pallet support portions, and
   wherein the pallet abutting portions can come into abutting contact with the abutting target portions of one of said plurality of pallets at positions outside the respective rear end posts in a lateral direction.

2. The plate material stocker facility according to claim 1, wherein each of the abutting target portions is a projecting piece projecting upward from a plate material placement surface at an end of the pallet in the front-back direction, and
   wherein the abutting portions come into abutting contact with one of a front surface and a rear surface of each of the projecting pieces of the pallet to slide the pallet from the first position to the second position or with the other of the front surface and rear surface of the projecting piece to slide the pallet from the second position to the first position.

3. The plate material stocker facility according to claim 2, wherein the pallet slide device is configured to carry the plate material into or out from a plate material processing machine.

* * * * *